US007782617B2

(12) United States Patent  (10) Patent No.: US 7,782,617 B2
Li et al.  (45) Date of Patent: Aug. 24, 2010

(54) HEAT DISSIPATION DEVICE

(75) Inventors: Jun-Hai Li, Shenzhen (CN); Xue-Wen Peng, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/423,817

(22) Filed: Apr. 15, 2009

(65) Prior Publication Data
US 2010/0165566 A1 Jul. 1, 2010

(30) Foreign Application Priority Data
Dec. 26, 2008 (TW) ............... 97150894 A

(51) Int. Cl.
*H05K 7/20* (2006.01)
(52) U.S. Cl. .............. 361/700; 165/104.33; 361/694; 361/695; 361/719
(58) Field of Classification Search .......... 361/700
See application file for complete search history.

(56) References Cited
U.S. PATENT DOCUMENTS

| 7,209,356 | B2 * | 4/2007 | Lee et al. .................. 361/719 |
| 7,283,364 | B2 * | 10/2007 | Refai-Ahmed et al. ...... 361/719 |
| 7,365,989 | B2 * | 4/2008 | Peng et al. .................. 361/720 |
| 7,382,618 | B2 * | 6/2008 | Peng et al. .................. 361/715 |
| 7,382,621 | B2 * | 6/2008 | Peng et al. .................. 361/719 |
| 7,492,596 | B1 * | 2/2009 | Peng et al. .................. 361/700 |
| 7,495,923 | B2 * | 2/2009 | Peng et al. .................. 361/719 |
| 7,580,262 | B2 * | 8/2009 | Chou et al. ................. 361/700 |
| 2003/0189815 | A1 * | 10/2003 | Lee .......................... 361/719 |
| 2007/0097646 | A1 * | 5/2007 | Peng ......................... 361/701 |
| 2007/0211432 | A1 * | 9/2007 | Peng et al. .................. 361/700 |
| 2008/0158820 | A1 * | 7/2008 | Peng et al. .................. 361/703 |
| 2009/0059524 | A1 * | 3/2009 | Peng et al. .................. 361/697 |

* cited by examiner

*Primary Examiner*—Gregory D Thompson
(74) *Attorney, Agent, or Firm*—Frank R. Niranjan

(57) ABSTRACT

A heat dissipation device for dissipating heat generated from an add-on card. The heat dissipating device includes two heat sinks and two heat pipes connecting with the two heat sinks. Each of the heat sinks includes a base and a fin group mounted on a top surface of the base. Each of the heat pipes includes a connecting section and two heat-conductive sections extending from opposite ends of the connecting section. One of the two heat-conductive sections of each of the heat pipes is sandwiched between the base and the fin group of one heat sink, and another of the two heat-conductive sections is sandwiched between the base and the fin group of another heat sink.

17 Claims, 4 Drawing Sheets

HEAT DISSIPATION DEVICE

BACKGROUND

1. Technical Field

The present disclosure relates to heat dissipation devices, and particularly, to a heat dissipation device having a heat pipe connecting with two heat sinks which contact a first electronic component and a second electronic component, respectively.

2. Description of Related Art

An add-on card such as a graphics card generally comprises a first processor and a second processor to enhance a computation speed and an operation efficiency of an electronic device having the add-on card. Two heat sinks contact the first and second processors, respectively, to dissipate heat generated from the two processors. In use, heat generated by the first processor is larger than that of the second processor. The heat sink contacting the first processor may not be able to sufficiently dissipate heat generated by the first processor, while the heat dissipating capability of the heat sink contacting the second processor may not be sufficiently utilized, whereby the first processor may overheat to have an unstable operation or even a malfunction.

What is needed, therefore, is a heat dissipation device which can overcome the above-described problems.

DETAILED DESCRIPTION

Figure 1:
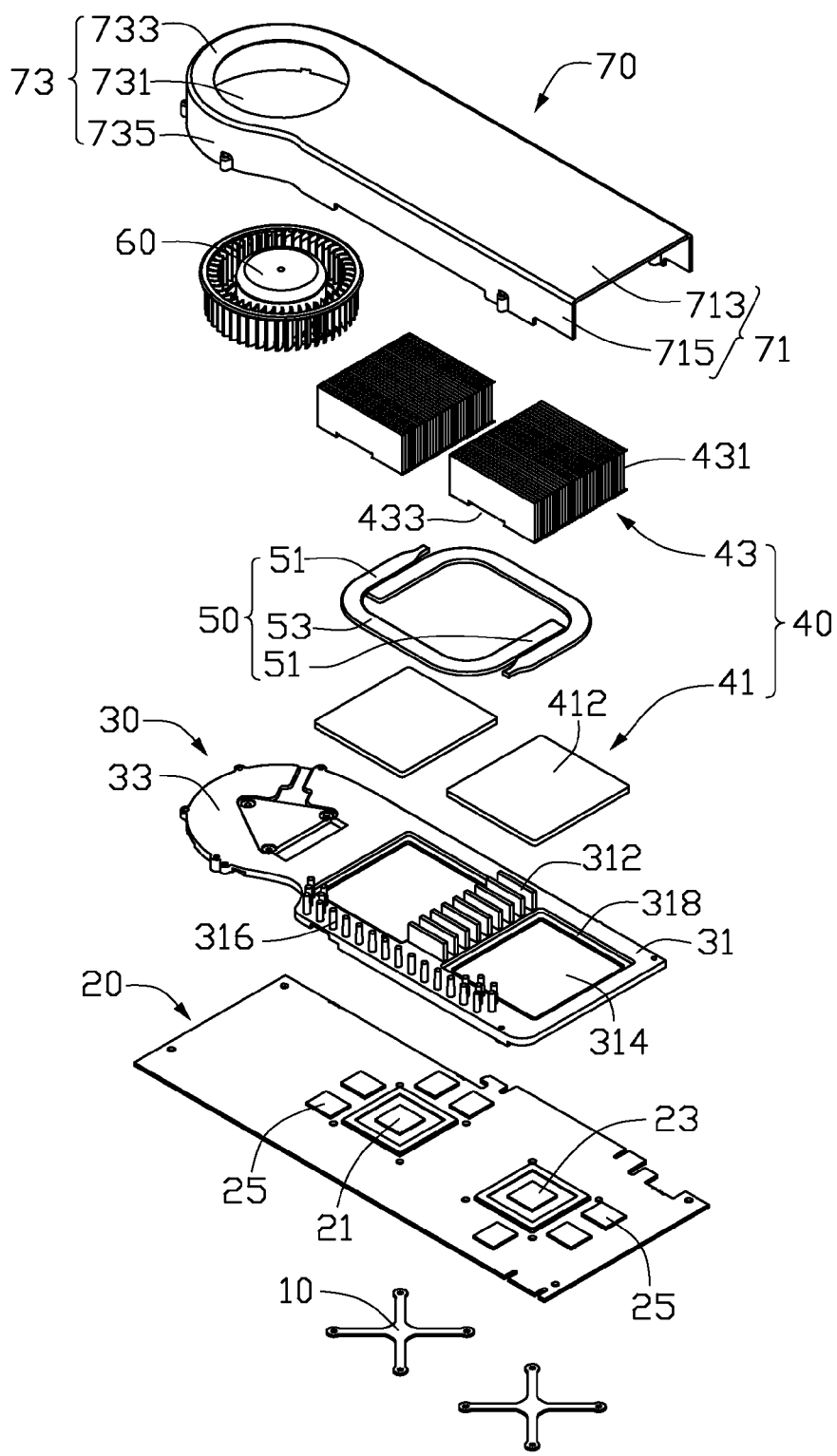
FIG. 1 is an exploded view of a heat dissipation device in accordance with an embodiment of the present disclosure, and an add-on card on which the heat dissipation device is to be mounted.
Figure 2:
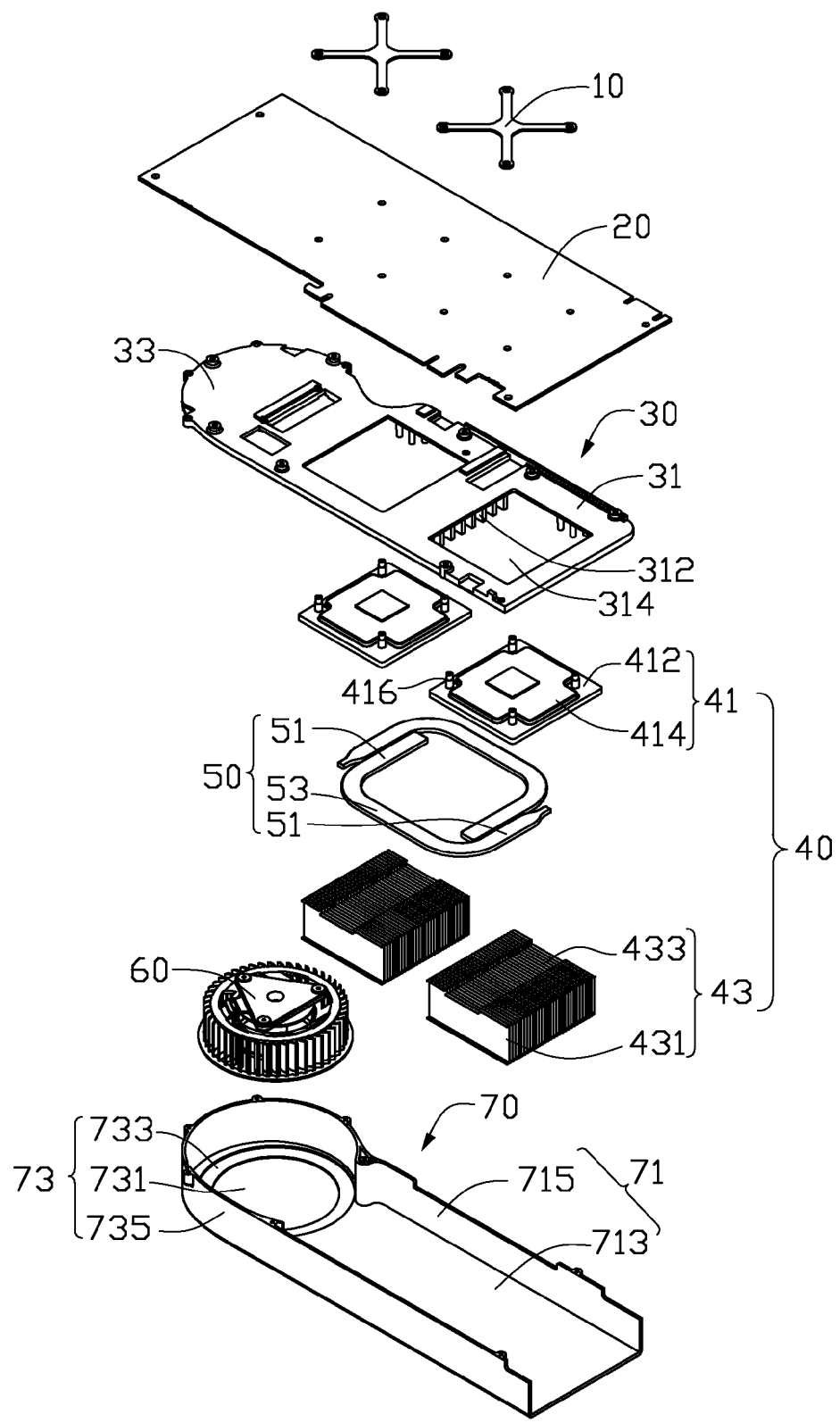
FIG. 2 is an inverted view of the heat dissipation device of FIG. 1 and the add-on card.
Figure 3:
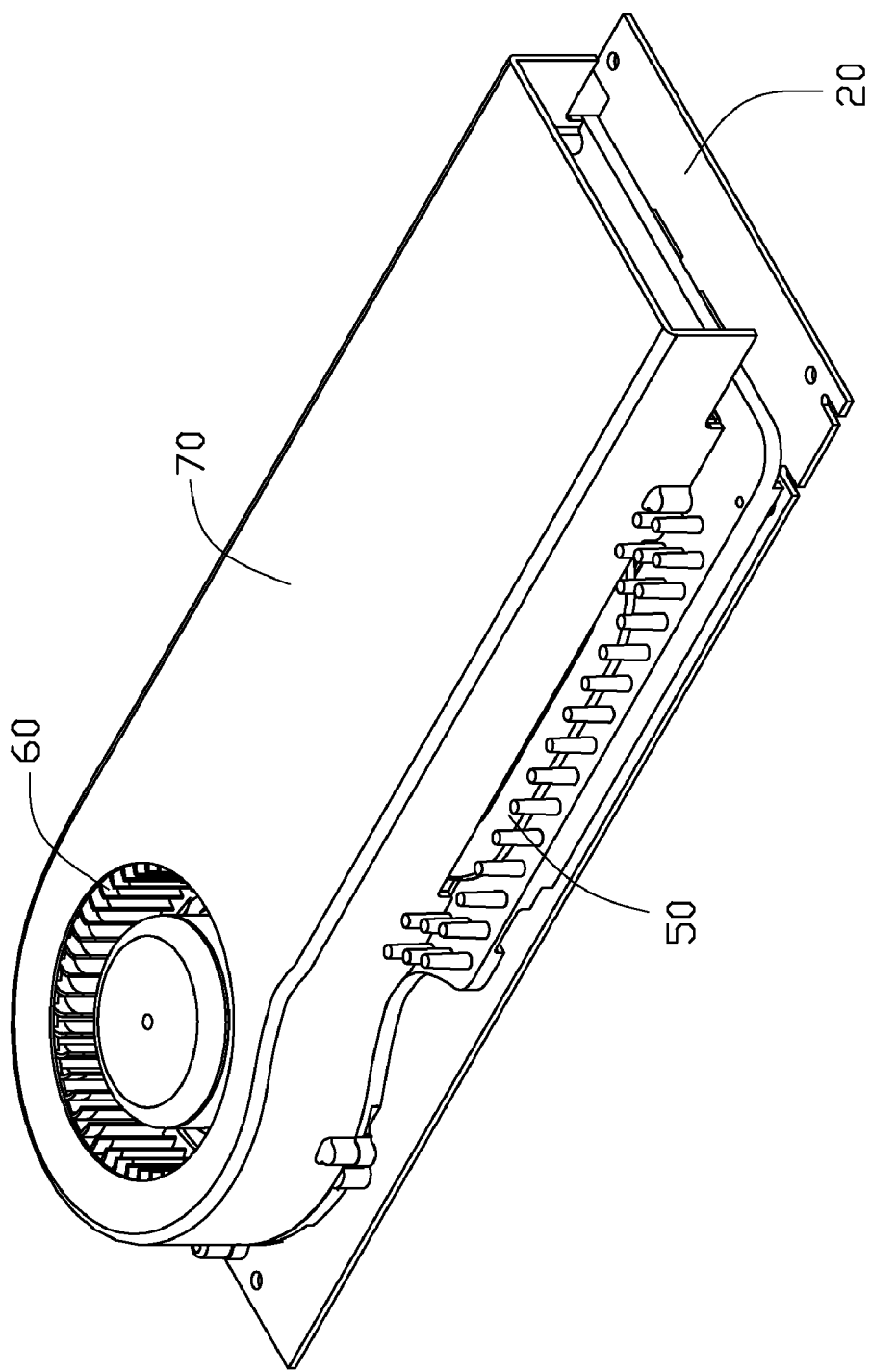
FIG. 3 is an assembled view of the heat dissipation device of FIG. 1 and the add-on card.
Figure 4:
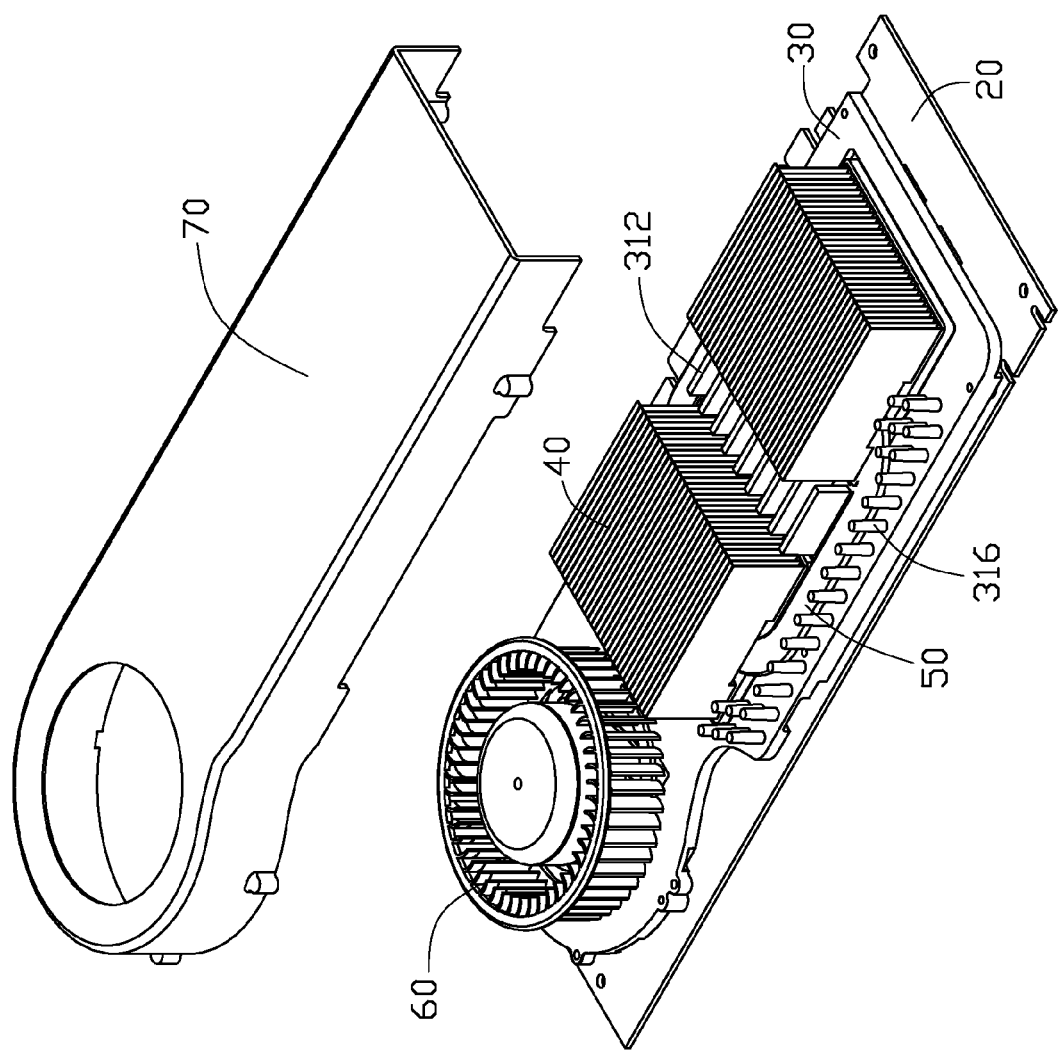
FIG. 4 is an assembled view of the heat dissipation device and the add-on card, with a fan cover being disassembled from the heat dissipation device of FIG. 3 for clarity.

Referring to FIGS. 1-4, a heat dissipation device of the present disclosure is used for dissipating heat generated from an add-on card 20. The add-on card 20 comprises a first processor 21, a second processor 23 spaced from the first processor 21, and a number of other electronic component 25 located around the first and second processors 21, 23. The heat dissipation device comprises a bracket 30 mounted on the add-on card 20 and contacting the other electronic components 25, two heat sinks 40 mounted on the bracket 30 and thermally contacting the first and second processors 21, 23 respectively, two heat pipes 50 connecting with the two heat sinks 40, a fan 60 mounted on a side of the bracket 30, and a fan cover 70 mounted on the bracket 30 and covering the fan 60 and the heat sinks 40. Two cross-shaped back plates 10 are fixed on a bottom surface of the add-on card 20 to support the add-on card 20 and connect the heat sinks 40 to the first and second processors 21, 23.

The bracket 30 is made of aluminum and comprises a rectangular engaging plate 31 and a circular extending plate 33 extending outwardly from an end of the engaging plate 31. A number of fins 312 extend upwardly from a central portion of a top surface of the engaging plate 31. The fins 312 are spaced from and parallel to each other. The fins 312 are arrayed along a width direction of the engaging plate 31. A number of pins 316 extend upwardly from a side of the engaging plate 31. The pins 316 are arrayed along a length direction of the engaging plate 31. The fins 312 and the pins 316 dissipate heat absorbed by the bracket 30. The engaging plate 31 defines two rectangular openings 314 at opposite sides of the fins 312. A flange 318 extends inwardly from a bottom edge of each of the openings 314. The two heat sinks 40 are received in the openings 314 and sit on the flanges 318, respectively. The heat sinks 40 contact the first and second processors 21, 23, respectively, and thermally connect therewith. A bottom surface of the engaging plate 31 contacts the other electronic components 25 of the add-on card 20 and thermally connects therewith. The fan 60 is mounted on a central portion of the extending plate 33 to generate an airflow through the heat sinks 40 thereby to cool the heat sinks 40.

Each of the heat sinks 40 comprises a base 41 and a fin group 43. The base 41 comprises a rectangular top plate 412 and a cross-shaped bottom plate 414 extending downwardly from a central portion of a bottom surface of the top plate 412. The base 41 is embedded in the bracket 30 in a manner such that an outer edge of a bottom surface of the top plate 412 abuts against the flange 318 and the bottom plate 414 extends through the opening 314. Four bolts 416 are formed at four corners of the bottom surface of the top plate 412, extending downwardly through four recessed corners of the bottom plate 414. The bolts 416 extend through the add-on card 20 and engage with a corresponding back plate 10 to mount the heat sink 40 and the bracket 30 on the add-on card 20.

The fin group 43 is mounted on a top surface of the top plate 412 of the base 41. The fin group 43 comprises a number of parallel fins 431. Each of the fins 431 is an elongated metal sheet and spaced from adjacent fins 431. A recess 433 is defined at a central portion of a bottom end of the fin group 43 to receive the heat pipes 50 therein.

Each of the heat pipes 50 is a flat heat pipe and has a U-shaped configuration. The heat pipe 50 comprises a connecting section 53 and two heat-conductive sections 51 extending perpendicularly from opposite ends of the connecting section 53. That is, the connecting section 53 and two heat-conductive sections 51 cooperatively define an opening. The two heat pipes 50 are coplanar at top faces and bottom faces thereof and are arranged with their two openings facing each other. The heat-conductive sections 51 of the two heat pipes 50 are alternate. The two heat-conductive sections 51 of one heat pipe 50 are parallel to and abut against the two heat-conductive sections 51 of the other heat pipe 50. One of the two heat-conductive sections 51 of one heat pipe 50 is located between the two heat-conductive sections 51 of the other heat pipe 50. The two connecting sections 53 of two heat pipes 50 are parallel to and spaced from each other. The two heat-conductive sections 51 of each of the heat pipes 50 are received in the two recesses 433 of the two fin groups 43 of the heat sinks 40, respectively. Two adjoining heat-conductive sections 51 of the two heat pipes 50 are received in the recess 433 of the fin group 43 of a corresponding heat sink 40.

The fan cover 70 is made of a bended metal sheet and comprises a first covering portion 71 and a second covering portion 73 extending outwardly from an end of the first covering portion 71. The first covering portion 71 comprises an elongated first top plate 713 and two first sidewalls 715 extend downwardly from opposite edges of the first top plate 713. The first covering portion 71 covers the two heat sinks 40 therein. The second covering portion 73 comprises a circular second top plate 733 horizontally extending from a lateral end of the top plate 713 of the first covering portion 71, and a second sidewall 735 extending downwardly from an outer edge of the top plate 713. An opening 731 is defined at a central portion of the second top plate 733 of the second covering portion 73 to guide airflow into the fan cover 70. The fan 60 is received in the second covering portion 73 and faces to the opening 731.

In assembly, the bracket 30 is secured on a top surface of the add-on card 20. In this state, the first and second processors 21, 23 are received in the two openings 314 of the engaging plate 31 of the bracket 30 and the other electronic component 25 of the add-on card 20 are contacted by the bottom surface of the engaging plate 31. The bottom plate 414 of the base 41 extends through the opening 314 of the engaging plate 31 and the top plate 412 of the base 41 abuts against the flange 318 of the engaging plate 31. The bolts 416 of the base 41 extend through the add-on card 20 and engage with the back plate 10 to mount the heat sink 40 and the bracket 30 on the add-on card 20. The two heat pipes 50 are fixed on the top surfaces of the top plates 412 of the two bases 41. In this state, the two heat-conductive sections 51 of each of the heat pipes 50 are fixed on the top surfaces of the top plates 412 of the two bases 41, respectively. The two connecting sections 53 of the two heat pipes 50 are located at opposite sides of the bases 41. The heat-conductive sections 51 of the heat pipes 50 are alternate and sandwiched between the fin groups 43 and the bases 41. The two heat-conductive sections 51 of one heat pipe 50 abut against the two heat-conductive sections 51 of the other heat pipe 50, respectively, and the two abutted heat-conductive sections 51 are parallel to each other. The fin groups 43 are mounted on the top surfaces of the top plates 412 of the bases 41. The abutted heat-conductive sections 51 of the two heat pipes 50 are received in the recesses 433 of the fin groups 43 and have the top faces thereof thermally contact the fin groups 43. The fan 60 is fixed on the central portion of the extending plate 33 of the bracket 30. The fan cover 70 is secured on the bracket 30. The first covering portion 71 of the fan cover 70 covers the heat sinks 40. The second covering portion 73 covers the fan 60. The connecting sections 53 of the two heat pipes 50 are located outside of the fan cover 70.

In use, heat generated by the first processor 21 is larger than that of the second processor 23. In the present disclosure, the heat pipes 50 connect with the two heat sinks 40 so that heat of the first processor 21 can also be dissipated by the heat sink 40 for the second processor 23. Therefore, the overheating of the first processor 21 can be avoided, and a heat dissipating efficiency of the heat sink 40 which contacts the second processor 21 can be improved.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A heat dissipation device for dissipating heat generated from an add-on card which has two processors thereon, the heat dissipation device comprising:
   two heat sinks spaced from each other, each of the heat sinks comprising a base and a fin group mounted on a top surface of the base, a bottom surface of the base of each of the two heat sinks being adapted for contacting one of the two processors of the add-on card, respectively; and
   a heat pipe comprising a first connecting section and two first heat-conductive sections extending from opposite ends of the first connecting section, wherein one of the two first heat-conductive sections is sandwiched between the base and the fin group of one of the heat sinks, and another of the two first heat-conductive sections is sandwiched between the base and the fin group of the another heat sink.

2. The heat dissipation device as claimed in claim 1, wherein a bottom end of the fin groups defines a recess, and a corresponding one of the first heat-conductive sections of the heat pipe is received in the recess of the fin groups and intimately contacts the fin groups.

3. The heat dissipation device as claimed in claim 2 further comprising another heat pipe which comprises a second connecting section and two second heat-conductive sections extending from opposite ends of the second connecting section, and the two second heat-conductive sections are received in the recesses of the bottom ends of the fin groups, respectively.

4. The heat dissipation device as claimed in claim 3, wherein the two first heat-conductive sections of the heat pipe abut against the two second heat-conductive sections of the another heat pipe, respectively, and the first connecting section and the second connecting section are spaced from and parallel to each other.

5. The heat dissipation device as claimed in claim 4, wherein the heat-conductive sections of the two heat pipes are alternate.

6. The heat dissipation device as claimed in claim 4, wherein the first and second heat-conductive sections received in a corresponding recess of the heat sink are coplanar and parallel to each other.

7. The heat dissipation device as claimed in claim 1, wherein a metallic bracket defines two spaced openings therein, and the two heat sinks are embedded in the two openings, respectively.

8. The heat dissipation device as claimed in claim 7, wherein the bracket forms a flange around a bottom of each of the openings, and the base of each of the two sinks abuts against a corresponding flange.

9. The heat dissipation device as claimed in claim 7, wherein a plurality of fins extends upwardly from the bracket.

10. The heat dissipation device as claimed in claim 7, wherein a fan is mounted on a side of the bracket to cool the heat sinks.

11. The heat dissipation device as claimed in claim 10, wherein a fan cover is mounted on the bracket and covers the heat sinks and the fan.

12. An electronic assembly comprising:
   an add-on card comprising a first primary electronic component, a second primary electronic component, the first and second primary electronic components spaced from each other and generating different amounts of heat during operation thereof;
   two heat sinks, each of the heat sinks comprising a base and a fin group mounted on a top surface of the base, the bases of the two heat sinks contacting the first and second primary electronic components of the add-on card, respectively; and
   a heat pipe comprising a first connecting section and two first heat-conductive sections extending from opposite ends of the first connecting section, wherein one of the two first heat-conductive sections is sandwiched between the base and the fin group of one of the heat sinks, and another of the two first heat-conductive sections is sandwiched between the base and the fin group of the another heat sink.

13. The electronic assembly as claimed in claim 12, wherein a metallic bracket is mounted on a top surface of the add-on card and defines two spaced openings therein, and the two heat sinks are embedded in the two openings and thermally contact the first and second primary electronic components, respectively.

14. The electronic assembly as claimed in claim 13, wherein a bottom surfaces of the bracket thermally contacts other electronic components of the add-on card.

15. The electronic assembly as claimed in claim 14, wherein a plurality of fins extends upwardly from a top surface of the bracket.

16. The electronic assembly as claimed in claim 14, wherein a fan is mounted on a side of the bracket to cool the heat sinks.

17. The electronic assembly as claimed in claim 12, wherein two back plates are mounted on a bottom surface of the add-on card and connect with the two heat sinks respectively.

* * * * *